United States Patent Office 3,431,245
Patented Mar. 4, 1969

3,431,245
PRODUCTION OF NOVEL POLYMERS AND POLYMERIZATION PROCESS THEREFOR
Gerhard Wolfgang Helmut Scherf and John Frederick Henderson, Sarnia, Ontario, Canada, assignors to Polymer Corporation Limited, Sarnia, Ontario, Canada, a body corporate and politic of Canada
No Drawing. Filed Sept. 14, 1964, Ser. No. 396,396
Claims priority, application Canada, Sept. 20, 1963, 884,971
U.S. Cl. 260—79.5        26 Claims
Int. Cl. C08f 25/00; C08g 23/00

ABSTRACT OF THE DISCLOSURE

Vulcanizable acrylic/unsaturated epoxy and acrylic/unsaturated epoxy/saturated epoxy polymers containing ether linkages in its backbone, prepared in the presence of a catalyst comprising an organometallic compound of a metal selected from Groups II and III of the Periodic Classification of the Elements, said organometallic compound having at least one organic radical linked to the metal atom through a carbon atom.

The present invention relates to novel polymeric materials and to a process for their preparation.

The use of free-radical-forming catalysts for the copolymerization of ethyl acrylate and allyl glycidyl ether is known. In this process, allyl glycidyl ether copolymerizes through its double bond with ethyl acrylate to form products having pendant epoxy groups on the copolymer molecule.

We have now surprisingly found that it is possible to copolymerize unsaturated epoxy compounds, such as allyl glycidyl ether, with certain acrylic-type monomers in such a manner that the unsaturated epoxy compound copolymerizes through its epoxy group to give valuable and novel copolymers having olefinically unsaturated sidechains. As a result of the presence of such pendant unsaturation, the copolymers of the present invention may be vulcanized in a conventional manner with a sulfur-containing vulcanization system to give valuable materials.

The acrylic-type compounds which may be used to form the novel copolymers of the present invention are those which correspond to the general formula:

RCH=CR'COOR"

in which R and R' are the same as or different from each other and each represents a hydrogen atom or an alkyl group having from one to four carbon atoms, and R" represents an aliphatic group having from one to eight carbon atoms.

Accordingly, the present invention provides a polymeric product comprising a copolymer of (a) at least one acrylic-type monomer corresponding to the general formula:

RCH=CR'COOR"

in which R and R' are the same as or different from each other and each represents a hydrogen atom or an alkyl group having from one to four carbon atoms, and R" represents an aliphatic group having from one to eight carbon atoms, and (b) at least one unsaturated epoxy monomer containing both monoolefinic unsaturation and an epoxy group, said copolymer containing ether linkages in its backbone and olefinically unsaturated sidechains.

It will be appreciated that, since the copolymerization of the aforesaid monomers occurs through the unsaturated group of the acrylic-type monomer and through the epoxy group of the unsaturated epoxy monomer, the resulting copolymer will contain —C—C— linkages in its backbone from the acrylic-type monomer and —C—C—O— linkages in its backbone and olefinically unsaturated sidechains from the unsaturated epoxy monomer.

The acrylic-type monomers which may be used to prepare the copolymers of the present invention are broadly defined in the above definition. The preferred acrylic-type monomers are those corresponding to the above formula in which R and R' are the same as or different from each other and each represents a hydrogen atom or an alkyl group having one or two carbon atoms and in which R" represents an alkyl group having from one to four carbon atoms. The most preferred acrylic-type monomers are alkyl acrylates in which the alkyl groups contain one to four carbon atoms. An example of such a preferred monomer is ethyl acrylate.

The copolymers of the present invention may be prepared from a wide range of unsaturated epoxy monomers, but it is preferred to use those which correspond to the general formula:

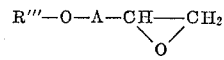

in which R''' represents an alkenyl group having from one to eight carbon atoms and A represents an alkylene group having up to four carbon atoms. Allyl glycidyl ether is a particularly suitable unsaturated epoxy monomer for use in preparing the copolymers of the present invention.

As previously stated, it is possible to use more than one acrylic-type monomer and more than one unsaturated epoxy monomer. It is further possible to obtain useful products in accordance with the present invention by copolymerizing the acrylic-type monomer or monomers and the unsaturated epoxy monomer or monomers with other monomers containing either polymerizable olefinically unsaturated groups or polymerizable epoxy groups. It is, for instance, possible to copolymerize the acrylic-type monomers and the unsaturated epoxy monomers with one or more saturated epoxy compounds. Examples of suitable saturated epoxy compounds which may be used for this purpose are alkylene oxides such as ethylene oxide and propylene oxide and halogenated alkylene oxides such as epichlorohydrin. The preferred saturated epoxy monomers which may be used in this particular embodiment of the present invention are those which correspond to the general formula:

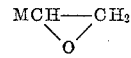

in which M represents a hydrogen atom, an unsubstituted or halogenated alkyl group having from one to eight carbon atoms or an unsubstituted or halogenated aryl group.

Although numerous combinations of the various monomers may be used to form valuable copolymers in accordance with the present invention, the following combinations are given as being illustrative:

(1) Ethyl acrylate and allyl glycidyl ether;
(2) Ethyl acrylate, allyl glycidyl ether and ethylene oxide;
(3) Etheyl acrylate, allyl glycidyl ether and propylene oxide;
(4) Ethyl acrylate, allyl glycidyl ether and epichlorohydrin;
(5) Ethyl acrylate, allyl glycidyl ether, ethylene oxide and propylene oxide;
(6) Ethyl acrylate, allyl glycidyl ether, ethylene oxide and epichlorohydrin;
(7) Ethyl acrylate, allyl glycidyl ether, propylene oxide and epichlorohydrin;
(8) Ethyl acrylate, allyl glycidyl ether, ethylene oxide, propylene oxide and epichlorohydrin.

It will be further appreciated that other acrylic-type monomers, such as butyl acrylate, within the above general definition may be used together with or instead of ethyl acrylate and that other unsaturated epoxy monomers may be used together with or instead of allyl glycidyl ether.

The relative proportions of the different monomers may be varied widely in order to provide polymers having a wide range of properties. The unsaturated epoxy monomer provides the side chain unsaturation which renders the copolymers sulphur-vulcanizable. For this purpose, only about 2 to 10 mole percent based on the total monomers are required for most applications although a much wider range such as 1 to 25 mole percent may be incorporated in accordance with the invention.

The novel copolymers of the present invention have varied properties. The actual properties of any such copolymer are dictated by the nature and the relative proportions of the monomer units which it contains. Many of these copolymers will find specific application in their vulcanized form as special purpose elastomeric materials since they have particularly valuable and useful associations of physical properties. It has, for instance, been found that some of these vulcanized copolymers have good stress-strain properties together with excellent resistance to ageing and to many hydrocarbon materials. Consequently, these particular products are useful in the production of hoses, gaskets and similar articles which are used in contact with such hydrocarbons. Some of the products also show improved low temperature properties.

The copolymers of the present invention may conveniently be prepared by copolymerizing the monomers in the presence of organo-metallic compounds of metals of Group II or III, for example boron, aluminum, zinc, magnesium and cadmium.

Accordingly, the present invention also provides a process for copolymerizing (a) at least one acrylic-type monomer corresponding to the general formula:

RCH=CR'COOR'' in which R and R' are the same as or different from each other and each represents a hydrogen atom or an alkyl group having from one to four carbon atoms and R'' represents an aliphatic group having from one to eight carbon atoms, and (b) at least one unsaturated epoxy monomer containing both monoolefinic unsaturation and an epoxy group, which comprises effecting said copolymerization in the presence of an organo-metallic compound of a metal of Group II or III of the Periodic Classification of the Elements.

Particularly satisfactory copolymerizations are effected using organo-metallic compounds which contain at least one organic radical linked to the metal atom through a carbon atom. Examples of such preferred compounds are aluminum alkyls and zinc alkyls containing one to four carbon atoms in their alkyl groups, such as aluminum triethyl and zinc diethyl. When aluminum alkyls and zinc alkyls are used, it is generally also useful to use a proton-donating cocatalyst such as water or an alcohol. Water is preferred but lower molecular weight alcohols, particularly those having one to six carbon atoms may also be used. The amount of cocatalyst used is such that the total number of active hydrogen atoms in the cocatalyst does not exceed the total number of alkyl groups linked to the metal atoms. It is generally preferred to use a considerably smaller amount. Satisfactory results have also been obtained using alumina as cocatalyst with aluminum triethyl. Such catalyst systems are used in catalytic amounts and satisfactory results may be obtained using amounts as low as 0.2 mole percent.

The copolymerization process of the present invention may be carried out in bulk but a more efficient reaction giving the product in a more convenient form is possible by effecting the copolymerization with the monomers in solution in a liquid unsubstituted or substituted hydrocarbon, particularly in an aromatic hydrocarbon such as benzene, or in a chlorinated hydrocarbon such as methylene chloride or chlorobenzene, which is inert with respect to both the monomers and the catalyst system, and in which the product is soluble. Satisfactory copolymerizations may also be effected in solution in saturated aliphatic hydrocarbons but, in such solvents, the product may partially precipitate. If desired, mixed solvents may be used.

Although the copolymerization may be carried out at room temperature, it is generally advantageous to effect it at slightly elevated temperatures of the order of 60° C. to 120° C., in order to increase the reaction rate. In general, the copolymerization will be carried out at a temperature of from 0° C. to 150° C., but the particular temperature which is used will be determined by the particular catalyst system adn the relative reactivities of the monomers.

As previously stated, the copolymers of the present invention may be vulcanized in a conventional manner with a sulphur-containing vulcanization system and the vulcanization process and the vulcanized products so obtained are within the scope of this invention.

The copolymers of the present invention, their preparation and their vulcanization will now be described in the following examples:

EXAMPLE 1

Into a dry 200 cc. glass bottle, there were introduced 25 ml. of benzene which had previously been dried over a Linde Molecular Sieve No. 4A. 25 ml. of ethyl acrylate and 2 ml. of allyl glycidyl ether were then added to the solvent, these monomers first having been purified by distillation after the addition of a small amount of calcium hydride to remove all traces of water. The amounts of the monomers which were used correspond to a molar proportion of 93.3% ethyl acrylate and 6.7% allyl glycidyl ether.

The bottle was then closed with a rubber stopper and 0.35 ml. of a 5 M solution of distilled water in dioxan was injected; this corresponded to the addition of 1.75 mmole of water. The catalyst, 0.308 g., corresponding to 2.5 mmole, of zinc diethyl was next injected into the bottle which was then shaken a few times and then sealed with a rubber-lined metal cap, using a Teflon gasket to prevent contact between the rubber lining and the contents of the bottle. The bottle and its contents were then maintained at a temperature of 60° C. for a period of 72 hours, after which time the contents of the bottle were transferred to aluminum trays and mixed with a few drops of methanol to destroy the catalyst. The solvent was then evaporated off and the product dried at 50–60° C. under vaccum to constant weight. There were finally obtained 8 g. of a soft polymeric product. This weight of copolymer corresponds to a conversion of 32% by weight.

This copolymer was then compounded on an open-roll mill in the following recipe, all parts being by weight:

|  | Parts |
|---|---|
| Polymer | 100 |
| NBS black | 50 |
| Zinc oxide | 5 |
| Stearic acid | 3 |
| Benzothiazyl disulphide | 0.5 |
| Tetramethyl thiuram disulphide | 1.1 |
| Sulphur | 2 |

The compounded stock was then vulcanized for 80 minutes at 325° F. to give a vulcanized stock having the following physical properties:

| | |
|---|---|
| Tensile strength p.s.i. | 1375 |
| Elongation at break percent | 400 |
| Modulus at 300% elongation p.s.i. | 1055 |

For comparison purposes, this example was repeated omitting the allyl glycidyl ether and there were obtained 7.9 g., corresponding to a conversion of 34% by weight of a tough rubbery product which did not, however, cure when compounded and treated in the above manner. The detection of allyl unsaturation in the region of 1635 cm.$^{-1}$ on examination of its infra-red spectrum indicates that the allyl glycidyl ether had copolymerized with the ethyl acrylate to give a copolymer having pendant unsaturation.

EXAMPLE 2

A copolymer was prepared from 750 ml. of ethyl acrylate and 75 ml. of allyl glycidyl ether in the general manner described in Example 1, except that a 2000 ml. glass reaction vessel and 750 ml. of benzene were used. The catalyst system comprised 1.5 ml. (83.3 mmole) of water and 3.4 g. (30 mmole) of aluminum triethyl and the polymerization was carried out for 12 hours at 90° C. The amounts of the monomers which were used correspond to 91.7 mole percent ethyl acrylate and 8.3 mole percent allyl glycidyl ether.

After the 12 hours, the reaction mixture was discharged into about 5 litres of cold commercial pentane containing 3% v./v. isopropanol. The polymer was then allowed to precipitate, filtered, washed once with about 500 ml. of commercial pentane, filtered again and dried in the manner described in Example 1.

After drying the polymeric product, 136.9 g. of a tough rubbery copolymer were obtained. This amount of product corresponds to a weight conversion of 17.9%.

This polymeric product was evaluated using the mix identified in Example 1 and, after vulcanization for 120 minutes at 293° F., the vulcanized stock had the following properties:

Tensile strength _____p.s.i__ 2050
Elongation at break: _____percent__ 440
Modulus at 300% elongation _____p.s.i__ 1560

Further samples of the vulcanized product were given different ageing treatments and the following results were obtained:

| Ageing treatment | Tensile strength (p.s.i.) | Elongation (percent) | Modulus 300% (p.s.i.) |
|---|---|---|---|
| 1 day in air at 302° F_____ | 2,450 | 290 | _____ |
| 70 hrs. in ASTM oil A-3 at 302° F_____ | 2,100 | 310 | 2,080 |

ASTM Oil A-3 is a high-swelling petroleum-based hydrocarbon oil having an aniline point of 70° C., a Saybolt Universal Viscosity of 155±5 sec., and a flash point of 330±5° F.

These results show the excellent resistance to ageing and to a hydrocarbon material of a product according to the invention.

EXAMPLE 3

A copolymer was prepared from 600 ml. of ethyl acrylate, 75 ml. of allyl glycidyl ether and 150 ml. of epichlorohydrin as described in Example 2, except that 30.5 mmole of aluminum triethyl were used. The amounts of the monomers which were used correspond to 68.6 mole percent ethyl acrylate, 7.7 mole percent allyl glycidyl ether and 23.7 mole percent epichlorohydrin.

After recovering the polymeric product as described in Example 2, 98.7 g., corresponding to a conversion of 12.3% by weight, of a tough rubbery copolymer were obtained.

This copolymer was then evaluated in the mix identified in Example 1 and, after vulcanization for 120 minutes at 325° F., the vulcanized stock had the following properties:

Tensile strength _____p.s.i__ 2100
Elongation at break _____percent__ 350
Modulus at 300% elongation _____p.s.i__ 1900

EXAMPLE 4

A copolymer was prepared from 50 ml. of ethyl acrylate, 6 ml. allyl glycidyl ether and 3 ml. ethylene oxide generally as described in Example 1, except that 75 ml. of benzene were used, the catalyst system comprised 5 mmole water, 5 mmole aluminum triethyl and 1.35 mmole zinc diethyl, and the polymerization was carried out for 39 hours at 60° C. The amounts of the monomers which were used correspond to 80.8 mole percent ethyl acrylate, 8.7 mole percent allyl glycidyl ether and 10.5 mole percent ethylene oxide.

After recovering the polymeric product as described in Example 1, 19.3 g. of a rubbery copolymer were obtained. This amount of product corresponds to a weight conversion of 35.3%.

The product was then compounded in the mix identified in Example 1, and after vulcanization for 120 minutes at 325° F., the vulcanized stock had the following physical properties:

Tensile strength _____p.s.i__ 810
Elongation at break _____percent__ 260

EXAMPLE 5

A copolymer was prepared from 500 ml. of ethyl acrylate, 62 ml. of allyl glycidyl ether, 125 ml. of epichlorohydrin and 200 ml. of ethylene oxide, as described in Example 2. The amounts of the monomers which were used correspond to 42.9 mole percent ethyl acrylate, 4.8 mole percent allyl glycidyl ether, 14.9 mole percent epichlorohydrin and 37.4 mole percent ethylene oxide.

After recovering the polymeric product as described in Example 2, 57.3 g. of a tough rubbery copolymer were obtained. This amount of product corresponds to a weight conversion of 6.8%.

This copolymer was evaluated using the mix identified in Example 1 and after vulcanization for 120 minutes at 293° F., the vulcanized stock had the following physical properties:

Tensile strength _____p.s.i__ 1980
Elongation at break _____percent__ 390
Modulus at 300% elongation _____p.s.i__ 1600

Further samples of the vulcanized product were given different ageing treatments and the following results were obtained:

| Ageing treatment | Tensile strength (p.s.i.) | Elongation (percent) | Modules 300% (p.s.i.) |
|---|---|---|---|
| 1 day in air at 302° F_____ | 2,170 | 230 | _____ |
| 70 hrs. in ASTM oil A-3 at 302° F_____ | 1,810 | 250 | _____ |

We claim:

1. A polymeric product comprising a copolymer of (a) at least one acrylic-type monomer corresponding to the general formula:

$$RCH{=}CR'COOR''$$

in which R and R' are each selected from the class consisting of a hydrogen atom and alkyl groups having one to two carbon atoms and R'' represents an alkyl group having from one to four carbon atoms, and (b) at least one unsaturated epoxy monomer which corresponds to the general formula:

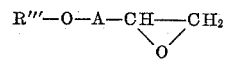

in which R''' represents an alkenyl group having up to eight carbon atoms and A represents an alkylene group having from one to four carbon atoms, said unsaturated epoxy monomer being present in the copolymer in an amount of 1–25 mole percent based on the total monomers, said copolymer containing ether linkages in its backbone and olefinically unsaturated side chains.

2. A polymeric product as claimed in claim 1 in which there are also incorporated, in said copolymer, units from at least one saturated epoxy monomer which corresponds to the general formula:

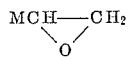

in which M is selected from the class consisting of a hydrogen atom, unsubstituted alkyl groups having from one to eight carbon atoms, halogenated alkyl groups having from one to eight carbon atoms, unsubstituted aryl groups, and halogenated aryl groups.

3. A polymeric product as claimed in claim 1 in which said acrylic-type monomer is an alkyl acrylate having from one to four carbon atoms in its alkyl group.

4. A copolymer as claimed in claim 2 in which said acrylic-type monomer is an alkyl acrylate having from one to four carbon atoms in its alkyl group.

5. A polymeric product comprising a copolymer of allyl glycidyl ether and at least one alkyl acrylate having one to four carbon atoms in its alkyl group, said allyl glycidyl ether being present in the copolymer in an amount of 1–25 mole percent based on the total monomers, said copolymer containing ether linkages in its backbone and olefinically unsaturated side chains.

6. A polymeric product as claimed in claim 5 in which said alkyl acrylate is ethyl acrylate.

7. A polymeric product comprising a copolymer of (a) at least one alkyl acrylate having from one to four carbon atoms in its alkyl group, and (b) from two to ten mole percent based on the total monomers of at least one unsaturated epoxy monomer corresponding to the general formula:

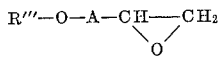

in which R''' is an alkenyl group having from one to eight carbon atoms and A is an alkylene group having from one to four carbon atoms, said copolymer containing ether linkages in its backbone and olefinically unsaturated side chains.

8. A polymeric product as claimed in claim 7 in which said alkyl acrylate is ethyl acrylate and said unsaturated epoxy monomer is allyl glycidyl ether.

9. A polymeric product as claimed in claim 8 in which there are also incorporated, in the copolymer, units from at least one saturated epoxy monomer selected from the class consisting of ethylene oxide, propylene oxide and epichlorohydrin.

10. A process for preparing a polymeric product which comprises polymerizing a monomeric mixture of (a) at least one acrylic-type monomer corresponding to the general formula:

$$RCH=CR'COOR''$$

in which R and R' are each selected from the class consisting of a hydrogen atom and alkyl groups having one to two carbon atoms and R'' is an alkyl group having from one to four carbon atoms, and (b) at least one unsaturated epoxy monomer which corresponds to the general formula:

in which R''' is an alkenyl group having up to eight carbon atoms and A is an alkylene group having from one to four carbon atoms, said mixture containing 1–25 mole percent of said unsaturated monomer, in the presence of an organo-metallic compound of a metal selected from Groups II and III of the Periodic Classification of the Elements, said compound having at least one organic radical linked to the metal atom through a carbon atom.

11. A process as claimed in claim 10 in which the monomeric mixture also contains at least one saturated epoxy monomer corresponding to the general formula:

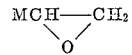

in which M is selected from the class consisting of a hydrogen atom, unsubstituted alkyl groups having from one to eight carbon atoms, halogenated alkyl groups having from one to eight carbon atoms, unsubstituted aryl groups, and halogenated aryl groups.

12. A process as claimed in claim 13 in which the catalyst system comprises a cocatalyst selected from water and alcohols and an organo-metallic compound comprising an alkyl of a metal selected from Groups II and III of the Periodic Classification, in which each alkyl group contains one to four carbon atoms, the amount of cocatalyst being such that the total number of active hydrogen atoms in the cocatalyst is less than the total number of alkyl groups linked to the metal atoms in the organo-metallic compound.

13. A process as claimed in claim 12 in which the amount of said unsaturated epoxy monomer is between two and ten mole percent based on the total monomers.

14. A process for preparing a polymeric product which comprises polymerizing a monomeric mixture of allyl glycidyl ether and at least one alkyl acrylate having from one to four carbon atoms in its alkyl group, in the presence of a catalyst system comprising a cocatalyst selected from water and alcohols and an organo-metallic compound selected from the class consisting of aluminum alkyls and zinc alkyls having from one to four carbon atoms in their alkyl groups, the amount of cocatalyst being such that the total number of active hydrogen atoms in the cocatalyst does not exceed the total number of alkyl groups linked to the metal atoms in the organo-metallic compound and the amount of said allyl glycidyl ether being between 2 and 10 mole percent based on the total monomers.

15. A process as claimed in claim 12 in which the monomeric mixture also contains at least one saturated epoxy monomer which corresponds to the general formula:

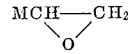

in which M is selected from the class consisting of a hydrogen atom, unsubstituted alkyl groups having from one to four carbon atoms, halogenated alkyl groups having from one to four carbon atoms, unsubstituted aryl groups, and halogenated aryl groups.

16. A process as claimed in claim 14 in which the monomeric mixture also contains a saturated epoxy monomer selected from the class consisting of ethylene oxide, propylene oxide and epichlorohydrin.

17. A process for preparing a polymeric product which comprises polymerizing a monomeric mixture of ethyl acrylate with from two to ten mole percent based on the total monomers of allyl glycidyl ether in the presence of a catalyst system comprising a cocatalyst selected from water and alcohols and an organo-metallic compound selected from aluminum trialkyls and zinc dialkyls having from one to four carbon atoms in their alkyl groups, said cocatalyst being present in such an amount that the total number of active hydrogen atoms in the cocatalyst is less than the total number of alkyl groups attached to the metal atoms in the organo-metallic compound, and in the presence of an inert liquid medium.

18. A process as claimed in claim 17 in which the monomeric mixture also contains at least one saturated epoxy monomer selected from the class consisting of ethylene oxide, propylene oxide and epichlorohydrin.

19. A process as claimed in claim 17 in which said liquid medium is selected from the class consisting of aromatic hydrocarbons and chlorinated hydrocarbons.

20. A process as claimed in claim 18 in which said liquid medium is selected from the class consisting of aromatic hydrocarbons and chlorinated hydrocarbons.

21. A vulcanized product obtained by the vulcanization using a sulphur-containing vulcanization system of a polymeric product comprising a copolymer of (a) at least one acrylic-type monomer corresponding to the general formula:

$$RCH=CR'COOR''$$

in which R and R' are each selected from the class consisting of a hydrogen atom and alkyl groups having one to two carbon atoms and R'' is an alkyl group having from one to four carbon atoms, and (b) at least one unsaturated epoxy monomer which corresponds to the general formula:

$$R'''-O-A-CH\underset{O}{\overset{}{\diagdown\diagup}}CH_2$$

in which R''' is an alkenyl group having up to eight carbon atoms and A is an alkylene group having from one to four carbon atoms, said unsaturated epoxy monomer being present in the copolymer in an amount of 1–25 mole percent based on the total monomers, said copolymer containing ether linkages in its backbone and olefinically unsaturated side chains.

22. A vulcanized product obtained by the vulcanization using a sulphur-containing vulcanization system of a polymeric product comprising a copolymer of allyl glycidyl ether and at least one alkyl acrylate having from one to four carbon atoms in its alkyl group, said allyl glycidyl ether being present in the copolymer in an amount of 1–25 mole percent based on the total monomers, said copolymer containing ether linkages in its backbone and olefinically unsaturated side chains.

23. A vulcanized product as claimed in claim 21 in which the copolymer also contains units from at least one saturated epoxy monomer corresponding to the general formula:

$$MCH\underset{O}{\overset{}{\diagdown\diagup}}CH_2$$

in which M is selected from the class consisting of a hydrogen atom, unsubstituted alkyl groups having from one to eight carbon atoms, halogenated alkyl groups having from one to eight carbon atoms, unsubstituted aryl groups, and halogenated aryl groups.

24. A vulcanized product as claimed in claim 22 in which the copolymer also contains units derived from at least one saturated epoxy monomer selected from the class consisting of ethylene oxide, propylene oxide and epichlorohydrin.

25. A vulcanized product obtained by the vulcanization using a sulphur-containing vulcanization system of a polymeric product comprising a copolymer of ethyl acrylate and from two to ten mole percent based on the total monomers of allyl glycidyl ether, said copolymer containing ether linkages in its backbone and olefinically unsaturated side chains.

26. A vulcanized product as claimed in claim 25 in which the copolymer also contains units derived from at least one saturated epoxy monomer selected from the class consisting of ethylene oxide, propylene oxide and epichlorohydrin.

References Cited
UNITED STATES PATENTS 3,110,695  11/1963  Ceresa _____ 260—89.5
3,225,120  12/1965  Baker _____ 260—874

HARRY WONG, Jr., *Primary Examiner.*

U.S. Cl. X.R.

260—41, 80.72, 86.1, 89.5